United States Patent
Mou et al.

(10) Patent No.: US 9,986,007 B2
(45) Date of Patent: May 29, 2018

(54) OWNERSHIP IDENTIFICATION, SIGNALING, AND HANDLING OF CONTENT COMPONENTS IN STREAMING MEDIA

(71) Applicant: Futurewei Technologies, Inc., Plano, TX (US)

(72) Inventors: Luntian Mou, Beijing (CN); Tiejun Huang, Beijing (CN); Yongliang Liu, Beijing (CN); Xin Wang, Rancho Palos Verdes, CA (US)

(73) Assignee: Futurewei Technologies, Inc., Plano, TX (US)

( * ) Notice: Subject to any disclaimer, the term of this patent is extended or adjusted under 35 U.S.C. 154(b) by 281 days.

(21) Appl. No.: 14/863,080

(22) Filed: Sep. 23, 2015

(65) Prior Publication Data
US 2016/0088047 A1    Mar. 24, 2016

Related U.S. Application Data

(60) Provisional application No. 62/054,273, filed on Sep. 23, 2014.

(51) Int. Cl.
| | | |
|---|---|---|
| G06F 15/16 | (2006.01) | |
| H04L 29/06 | (2006.01) | |
| H04L 29/08 | (2006.01) | |
| H04N 21/4627 | (2011.01) | |
| H04N 21/254 | (2011.01) | |
| H04N 21/472 | (2011.01) | |
| G06T 1/00 | (2006.01) | |
| H04N 21/845 | (2011.01) | |
| G11B 27/10 | (2006.01) | |
| G06F 21/10 | (2013.01) | |

(52) U.S. Cl.
CPC ............ H04L 65/601 (2013.01); G06F 21/10 (2013.01); G06T 1/0021 (2013.01); G11B 27/10 (2013.01); H04L 65/4084 (2013.01); H04L 67/02 (2013.01); H04N 21/2541 (2013.01); H04N 21/4627 (2013.01); H04N 21/47202 (2013.01); H04N 21/8456 (2013.01)

(58) Field of Classification Search
USPC ................. 709/219, 211, 212, 214, 215, 216
See application file for complete search history.

(56) References Cited

PUBLICATIONS

"Information Technology—Dynamic Adaptive Streaming over HTTP (DASH)—Part 1: Media Presentation Description and Segment Formats," ISO/IEC JTC 1/SC 29, ISO/IEC 23009-1:2012(E), ISO/IEC JTC 1/SC 29/WG 11, Jan. 1, 2012, 133 pages.

*Primary Examiner* — Lan-Dai T Truong
(74) *Attorney, Agent, or Firm* — Conley Rose, P.C.

(57) ABSTRACT

A content server comprising a processor coupled to the receiver configured to obtain a media content component, identify an ownership of the media content component, and generate a Dynamic Adaptive Streaming over Hypertext Transfer Protocol (HTTP) (DASH) Media Presentation Description (MPD) indicating storage locations of segments of the media content component, indicating instructions for displaying the segments of the media content component, and indicating ownership of the media content component, a receiver coupled to the processor and configured to receive a request from a client for the media content component, and a transmitter coupled to the processor and configured to transmit the DASH MPD indicating the ownership of the media content component to the client in response to receiving the request.

20 Claims, 7 Drawing Sheets

OWNERSHIP IDENTIFICATION, SIGNALING, AND HANDLING OF CONTENT COMPONENTS IN STREAMING MEDIA

CROSS-REFERENCE TO RELATED APPLICATIONS

The present application claims priority to U.S. Provisional Patent Application 62/054,273, filed Sep. 23, 2014 by Luntian Mou, et. al., and entitled "METHOD AND SYSTEM FOR OWNERSHIP IDENTIFICATION, SIGNALING, AND HANDLING OF CONTENT COMPONENTS IN STREAMING MEDIA," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The development of Internet and multimedia technologies has improved the creation and dissemination of media content, while posing severe challenges for copyright protection and supervision. Streaming media has become a primary method for delivering media content to end users (e.g. clients). However, the failure to provide a sound mechanism for ensuring the rights of content owners are protected has resulted in a proliferation of unauthorized copies of media content on the Internet. The proliferation of unauthorized copies has resulting in huge economic damages to content owners and leads costly litigation.

SUMMARY

In one embodiment, the disclosure includes a content server comprising a processor coupled to the receiver configured to obtain a media content component, identify the ownership of the media content component, and generate a Dynamic Adaptive Streaming over Hypertext Transfer Protocol (HTTP) (DASH) Media Presentation Description (MPD) indicating storage locations of segments of the media content component, indicating instructions for displaying the segments of the media content component, and indicating ownership of the media content component, a receiver coupled to the processor and configured to receive a request from a client for the media content component, and a transmitter coupled to the processor and configured to transmit the DASH MPD indicating the ownership of the media content component to the client in response to receiving the request.

In another embodiment, the disclosure includes a method implemented in a DASH client, the method comprising requesting, via a transmitter, media content from a DASH server, receiving, via a receiver, a DASH MPD indicating storage locations of segments of the media content, indicating instructions for displaying the segments of the media content, and indicating ownership information associated with the media content, obtaining, via the transmitter and the receiver, at least some of the segments from the storage locations indicated by the DASH MPD, and displaying, via a display, the obtained segments according to the instructions for displaying the segments and the ownership information.

In another embodiment, the disclosure includes a method implemented in a DASH content server, the method comprising receiving, by a receiver of the DASH content server, a media content component, identifying, by a processor of the DASH content server, an ownership of the media content component, generating, by the processor, a DASH MPD indicating storage locations of segments of the media content component, indicating instructions for displaying the segments of the media content component, and indicating ownership of the media content component, receiving, by the receiver, a request from a client for the media content component, and transmitting, by a transmitter of the DASH content server, the DASH MPD indicating the ownership of the media content component to the client in response to receiving the request.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
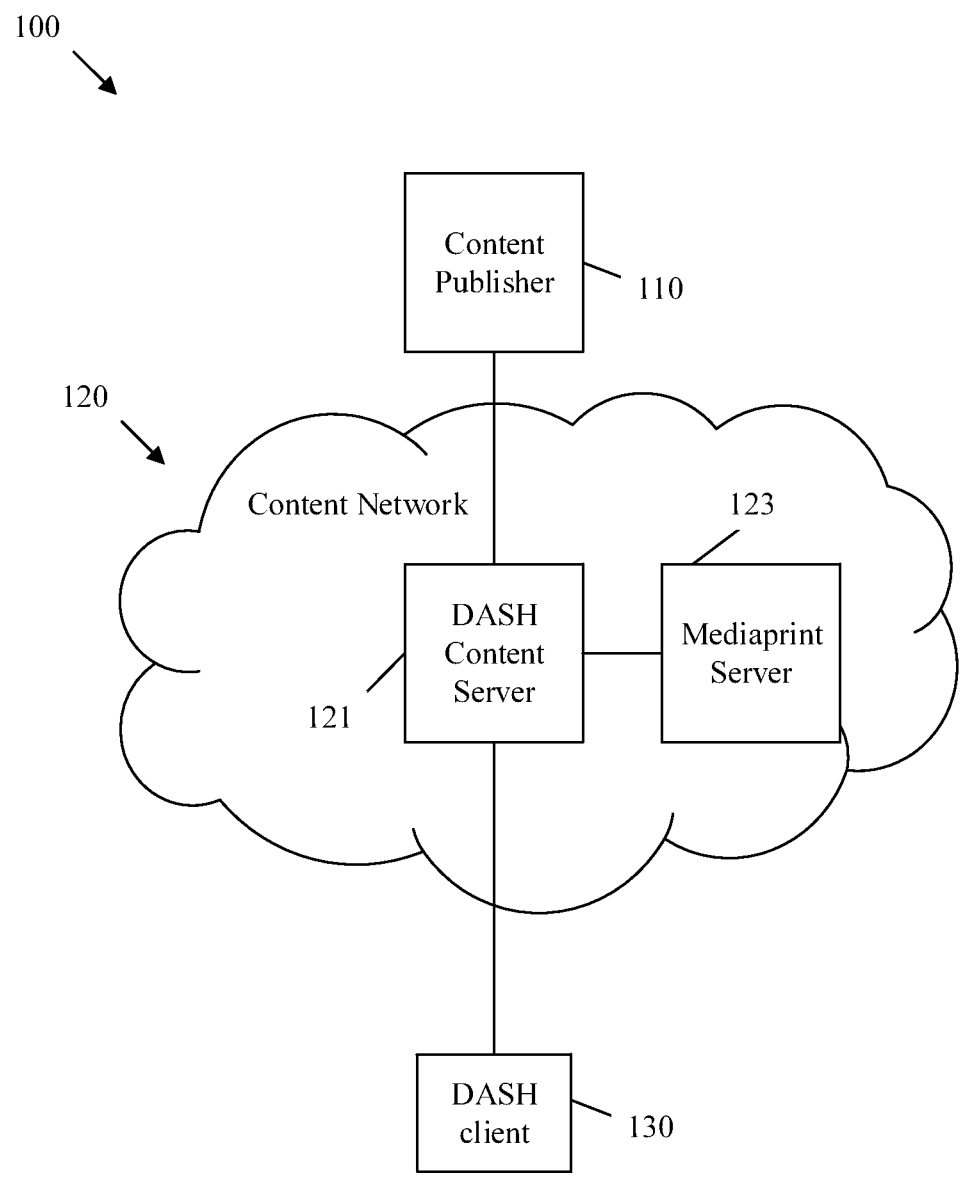
FIG. 1 is a schematic diagram of an embodiment of a Dynamic Adaptive Streaming over Hypertext Transfer Protocol (HTTP) (DASH) enabled network architecture.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

HTTP is an example mechanism for delivering media content. Media may be any data that can be employed as part of a multi-media presentation, for example audio data, video data, supporting text, etc. Media content has one media content period or a contiguous sequence of media content periods. Media content may be subdivided into media content components. A media content component is one contiguous component of the media content with an assigned media component type that can be encoded individually into a media stream. A media content period comprises of set of media content components that have a common timeline as well as relationships on how they can be presented. Progressive download and pseudo streaming may be employed for delivering pre-recorded media over HTTP and may support content seeking functionality. DASH is discussed, and further terms are defined, in International Organization for Standardization (ISO)/International Electrotechnical Commission (IEC) document 23009-1:2012(E) entitled "Information technology—Dynamic adaptive streaming over HTTP (DASH)—Part 1: Media presentation description and segment formats," which is incorporated by reference. DASH specifies a format for a media presentation description (MPD) and adaptive delivery of associated Moving Picture Experts Group (MPEG) media content by segment over HTTP. An MPD is a manifest file indicating a formalized description for a Media Presentation for the purpose of providing a streaming service, and a Media Presentation is a collection of data that establishes a bounded or unbounded presentation of media content. Although DASH enables Internet streaming media services, DASH fails to provide mechanisms to protect the rights of content owners. For example, DASH mainly supports delivery of protected content, indicates protected content components, and indicates content protection and rights management systems employed in the creation of the media content. DASH may not support signaling of the ownership of media content components and may not communicate appropriate policies to be employed when handling a media content component if the content is an unauthorized copy. Further, DASH may fail to support identification of media content at all times during the life circle of the media content. Finally, DASH fails to specify a mechanism to ensure both authorized and unauthorized copies of media content are handled and/or monitored according to policies previously selected by content owners.

Disclosed herein are various embodiments, which may support ownership signaling and associated media content management in a DASH environment. Upon receipt of a media content component, for example from a media content publisher, a DASH server identifies ownership of the media. Ownership identification may be performed by reviewing a media content components data file for a unique digital copyright identifier, extracting/analyzing a watermark from the media content, and/or generating a unique mediaprint from the media content for comparison with pre-stored mediaprints. The DASH server then generates an MPD file identifying the owner of the content, indicating whether the media content is an authorized copy, and identifying operations list(s) indicating operations to be performed by a DASH client based on the ownership data of the media content. Upon request, the MPD file is forwarded to the DASH client. The DASH client then analyzes the MPD file to determine content ownership, file authorization, and operations to be performed. Based on the MPD file, the DASH client determines the location of the media content's file segments, determines instructions for presenting the media content to an end user, and manages display of the media content in light of the ownership information. DASH ownership signaling is discussed further in Institute of Electrical and Electronics Engineers (IEEE) document 1857.7 entitled "Standard for Adaptive Streaming," which is incorporated by reference.

FIG. 1 is a schematic diagram of an embodiment of a DASH enabled network 100 architecture. Network 100 may comprise a content network 120 comprising one or more DASH content server(s) 121 and/or one or more mediaprint server(s) 123. Network 100 further comprises a content publisher 110 and a DASH client 130. A content publisher 110 publishes media content on the content network 120, for example in the DASH content server 121. In some embodiments, a mediaprint of the media content is stored in the mediaprint server 123. The DASH content server 121 prepares an MPD file describing instructions to locate the media content, instructions to display the media content, and ownership information regarding the media content. A DASH client 130 may request the media content from the DASH content server 121 and may receive the MPD. The DASH client 130 may then receive the MPD, obtain the content, perform specified ownership related operations, and display the content according to instructions in the MPD.

The content network 120 may be any network configured to receive, store, and provide media content upon demand. For example, content network 120 may be an internet protocol (IP) based storage network, a cloud network, a software defined network (SDN), an information centric network (ICN), a content distribution network (CDN), etc. The content network 120 may comprise one or more domains, internal nodes/NEs coupled by internal links, border routers for security. The content network's 120 NEs include the DASH content server 121 and, in some embodiments, the mediaprint server 123.

The DASH content server 121 may be any device configured to serve HTTP requests from client 130. The DASH content server 121 may comprise a dedicated server, a server cluster, a virtual machine (VM) in a cloud computing environment, or other suitable content management entity. The DASH content server 121 may receive media content from the content publisher(s) 110, for example upon registration of the media content. The media content may include video files, audio files, combined audio video files, media represented in multiple languages, subtitled media, or combinations thereof. The DASH content server 121 determines ownership information for the media content including the identity of the owner of the media content (e.g. the content publisher 110), whether the media content is an authorized copy, and any operations required by the owner upon display of the media content to an end user. The DASH server 121 also determines the storage location(s) of the media content as well as any instructions needed to properly present/display the content to the end user. The media content is described in terms of periods, adaptation sets, representations, and segments, as discussed further below. The DASH server 121 generates an MPD file with information indicating Universal Resource Locators (URLs) and/or a URL scheme, which may allow the client 130 to locate segments of the media content. The DASH server 121 also includes any other information the client 130 may require to present the data, such as period information, timing, segment format information, multiplexing information, etc. The DASH server 121 also encodes the ownership information in the MPD. The ownership information may include operations list(s) indicating required operations associated with the media content. For example, the operations lists may be different for different adaptation sets, representations, segments, etc. The operations lists may also be different depending on whether the media content is authorized and/or whether the ownership information is verifiably correct when the media content is displayed. For example, operations may include requiring certain content periods be displayed with specified other content periods (e.g. displaying required advertisements before playing the content), filtering out portions of the media content when the content is not authorized to prevent display to the user or further sharing over the internet, requesting a user of the DASH client pay prior to displaying the media content, reporting DASH client media content usage statistics/behavior, requiring display of a specified representations (e.g. lower resolution) if the client has not paid for the content (e.g. user payment status), or combinations thereof. The DASH content server 121 transmits the MPD file to the client 130 upon request. In cases where some or all of the media content is stored on the DASH content server 121, the DASH content server 121 may also transmit segments to the client 130 upon request.

The mediaprint server 123 is an optional component for supporting media content identification in some embodiments. The mediaprint server 123 may be substantially similar to the DASH content server 121 and/or contained in the DASH content server 121. The mediaprint server 123 may also comprise a mediaprint database for storing mediaprints. Media content can be identified by embedding a unique digital copyright identifier (e.g. a string of characters) into the media content data file or by embedding a visually imperceptible watermark in the images of the media content file. The embedding of the unique digital copyright identifier and/or the watermark may occur during registration of the media content to the content network 120. Such identification requires modification of the media content that can be removed by a malicious user. For example, the media content could be recorded in analog and re-digitized to remove the identification. As another option, a mediaprint can be created by extracting intrinsic features from the media content and including such features or dimension reduced version of such features (e.g. feature vectors) as a separate mediaprint representation. Each mediaprint, sometimes called a video fingerprint or signature, being unique to the associated media content, does not require modification of the media content, and hence cannot be removed from the media content. The mediaprint server 123 is configured to extract and/or store mediaprints in the mediaprint database, for example upon registration of the media content. The mediaprint server 123 can be employed to compare an extracted mediaprint against stored mediaprints to determine ownership in response to a request from either the DASH content server 121 (e.g. during creation of the MPD) or in response to a request from the client 130 (e.g. during ownership analysis prior to display). The mediaprint server 123 may be employed to identify the media content alone or in combination with digital copyright identifier and/or watermarks. In some embodiments, the mediaprint server 123 may not be positioned inside the content network 120 (e.g. a global mediaprint server 123.)

The content publisher 110 comprises any device configured to register and/or forward media content to the content network 120 for storage and distribution. The content publisher 110 may transcode the media content to provide multiple representations (e.g. resolutions) of the media content. Transcoding may also be performed by the content network 120. The content publisher 110 may also provide multiple adaptation sets (e.g. different language audio tracks, subtitles in various languages, etc.). The content publisher 110 may be operated by or on behalf of the media content owner and may obtain/forward the ownership information to the content network 120 for ownership identification and MPD generation by the DASH content server 121.

The DASH client 130 may be a device configured to obtain media content via a DASH protocol and present such media content to a user, such as a mobile phone, personal computer (PC), IP television (TV), IPTV set top box, laptop PC, internet radio device, tablet PC, media storage device, etc. The DASH client 130 may directly present the media content (e.g. visual data via a screen, audio data via a speaker, etc.) and/or may save and/or transmit the media content to other device(s) for presentation. The DASH client 130 may request an MPD file, for example via an HTTP GET request. The client 130 may then review the MPD file to determine URLs for segments, ownership information, representation multiplexing data, etc. The DASH client 130 may also obtain the segments needed to display the media content, for example via an HTTP GET request(s) to the DASH content server 121, the content network 120, and/or any other suitable storage location. Upon receiving the necessary information, the DASH client 130, may determine ownership and/or authorization status of the media content, perform any required operations from the operations list(s), obtain and/or multiplex the segment data as directed by the MPD, present the media content to the user, and/or transmit the media content to another device for storage/presentation to the user. Accordingly, by determining/managing ownership at the DASH content server 121 and the DASH client 130, the DASH client 130 displays the media content to the end user based on the terms and conditions set by the content publisher 110 during registration.

Figure 2:
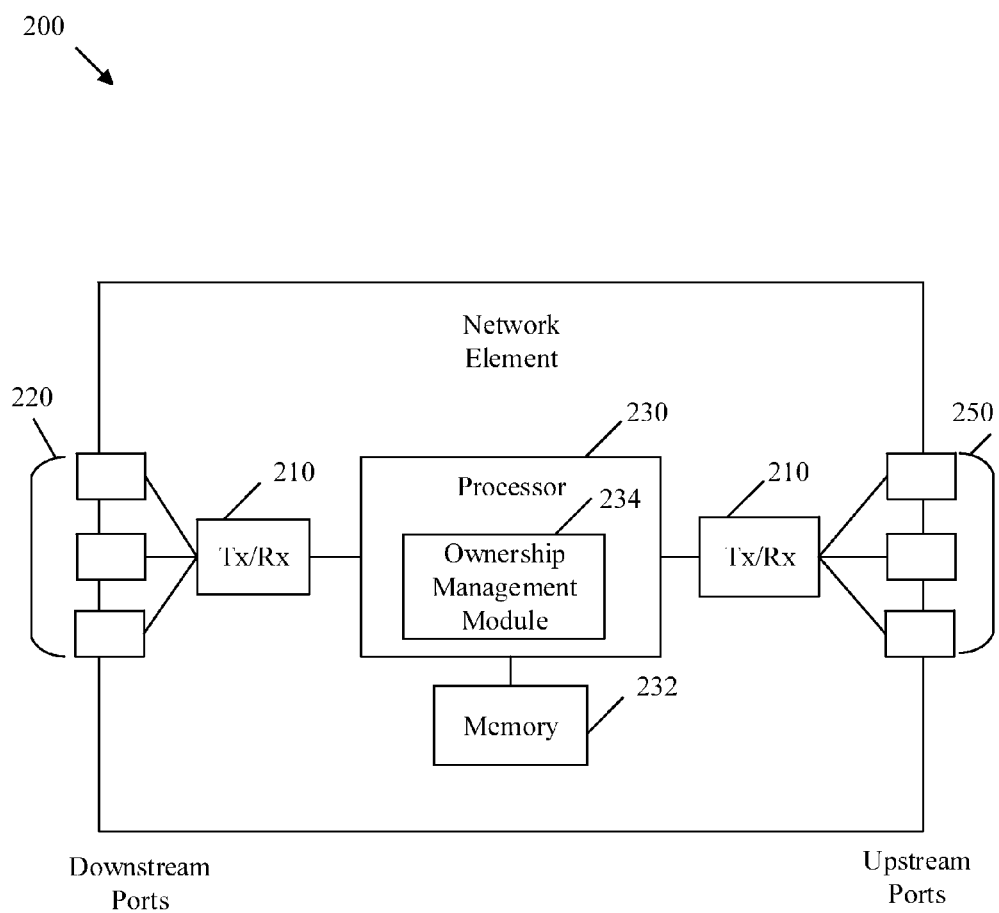
FIG. 2 is a schematic diagram of an embodiment of a Network Element (NE) which may act as a DASH compatible network node.

FIG. 2 is a schematic diagram of an embodiment of a NE 200 which may act as a DASH compatible network node, such as a content publisher 110, a DASH content server 121, a mediaprint server 123, a DASH client 130, or any other node in a content network 120, and may be configured to determine, signal, and or manage media content ownership information, for example by sending/receiving ownership information via an MPD. NE 200 may also implement architectures 400 and/or 500 and methods 600 and/or 700 as discussed below. NE 200 may be implemented in a single node or the functionality of NE 200 may be implemented in a plurality of nodes in a content based network. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 200. For instance, the features/methods in the disclosure may be implemented using hardware, firmware, and/or software installed to run on hardware. The NE 200 may be any device that transports frames through a network, e.g., a switch, router, bridge, server, a client, etc. As shown in FIG. 2, the NE 200 may comprise transceivers (Tx/Rx) 210, which may be transmitters, receivers, or combinations thereof. A Tx/Rx 210 may be coupled to plurality of downstream ports 220 (e.g. downstream interfaces) for transmitting and/or receiving frames from other nodes and a Tx/Rx 210 coupled to plurality of upstream ports 250 (e.g. upstream interfaces) for transmitting and/or receiving frames from other nodes, respectively. A processor 230 may be coupled to the Tx/Rxs 210 to process the frames and/or determine which nodes to send frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise an ownership management module 234.

The ownership management module 234 may exchange ownership information, encode ownership information in an MPD file, and/or extract ownership information from the MPD file, depending on the embodiment. In an alternative embodiment, the ownership management module 234 may be implemented as instructions stored in memory 232, which may be executed by processor 230. In another alternative embodiment, the ownership management module 234 may be implemented on separate NEs. The downstream ports 220 and/or upstream ports 250 may contain electrical and/or optical transmitting and/or receiving components.

It is understood that by programming and/or loading executable instructions onto the NE 200, at least one of the processor 230, ownership management module 234, downstream ports 220, Tx/Rxs 210, memory 232, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
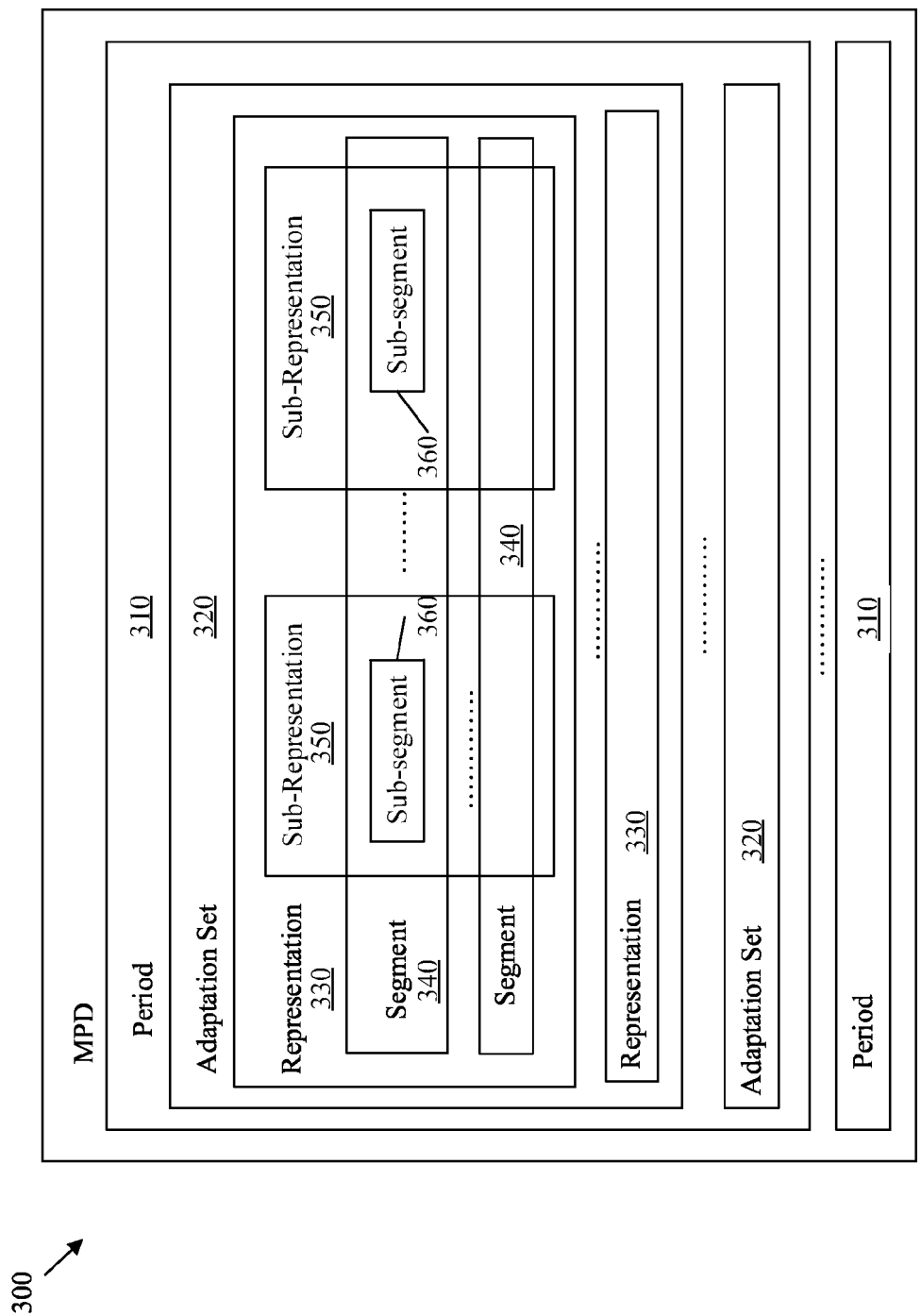
FIG. 3 is a schematic diagram of an embodiment of an MPD.

FIG. 3 is a schematic diagram of an embodiment an MPD 300, which may be employed to manage ownership information. The MPD 300 may be employed by a DASH content sever or a DASH client, such as DASH content sever 121 or DASH client 130, respectively. The MPD may comprise information for one or more periods 310. Each period 310 may comprise one or more adaption sets 320. Each adaptation set 320 may comprise one or more representations 330. Each representation 330 may comprise one or more segments 340 and/or one or more sub-representations 350. Each segment 340 may comprise one or more sub-segments. The periods 310 each comprise timing data and indicate a content period during which a consistent set of encoded versions of the media content is available (e.g. a set of available bitrates, languages, captions, subtitles etc. that do not change). An adaptation set 320 represents a set of interchangeable encoded versions of one or several media content components. For example, a first adaptation set 320 may comprise a main video component, a second adaptation set 320 may comprise a main audio component, a third adaptation set 320 may comprise captions, etc. An adaption set 320 may also comprise multiplexed content, such as combined video and audio. A representation 330 describes a deliverable encoded version of one or more media content components, such as an ISO base media file format (ISO-BMFF) version of the content, a MPEG version two transport system (MPEG-2 TS) version of the content, etc. A representation 330 may describe, for example, any needed codecs, encryption and/or other data needed to present the media content. Different representations 330 may be encoded in varying resolutions (e.g. transcoded copies from a common high definition copy). A client, such as DASH client 130, may dynamically switch between representations based on network conditions, device capability, user choice, etc., which may be referred to as adaptive streaming. Representations 330 may be divided into sub-representations 350 such that each sub-representation 350 contains content with common properties (e.g. common codec, sampling rate, frame rate, etc.) Each segment 340 may comprise the media content data, may be associated with a URL, and may be retrieved by the client as needed, e.g. with an HTTP GET request. Each segment 340 may contain a pre-defined byte size (e.g., 1,000 bytes) and/or an interval of playback time (e.g., 2 or 5 seconds) of the media content. A segment 340 may comprise an individually addressable unit of data that can be downloaded using URLs advertised via the MPD. Segments 340 may be further divided into sub-segments 360, which may each comprise a complete accessible data unit, and may be correlated by an index. The periods, adaptation sets, representations, and/or segments may be described in terms of attributes and elements, which may be modified to affect the presentation of the media content by the client device.

As discussed above, the MPD may comprise ownership information including elements/attributes such as an identifier of the media content, an identifier of the owner of the content, an indication of whether the content is an authorized copy, and operations lists. It should be noted that different periods 310, adaptation sets 320, representations 330, segments 340, sub-representations 350, and/or sub-segments 360 may comprise different ownership information. For example, different periods 310 may be owned by different entities, for example when a first period is a video and a second video is a required advertisement. Further, different portions of the content (e.g. periods 310, adaptation sets 320, representations 330, segments 340, sub-representations 350, and/or sub-segments 360) may be associated with different operations lists. For example, some segments 340 may be displayed when the content is authorized while other segments are filtered out (e.g. allowing a specified amount of the video to be shown as a preview before requiring payment to unlock additional segments). Operations lists may also be contingent on whether an associated portion of the content is authorized or not. For example, user statistics tracking and reporting may be required when displaying an unauthorized portion of the content. As another example, only low resolution representations may be displayed when a portion of the content is unauthorized. Such flexibility is supported by allowing each period 310, adaptation set 320, representation 330, segment 340, sub-representation 350, and/or sub-segment 360 to comprise a different owner, authorization status, and/or operations list(s). Further, authorization status for a portion may be set to unauthorized if an identification of the owner is determined to have been improperly modified, for example by comparing an extracted mediaprint with a mediaprint database by the DASH client or by the DASH server.

Figure 4:
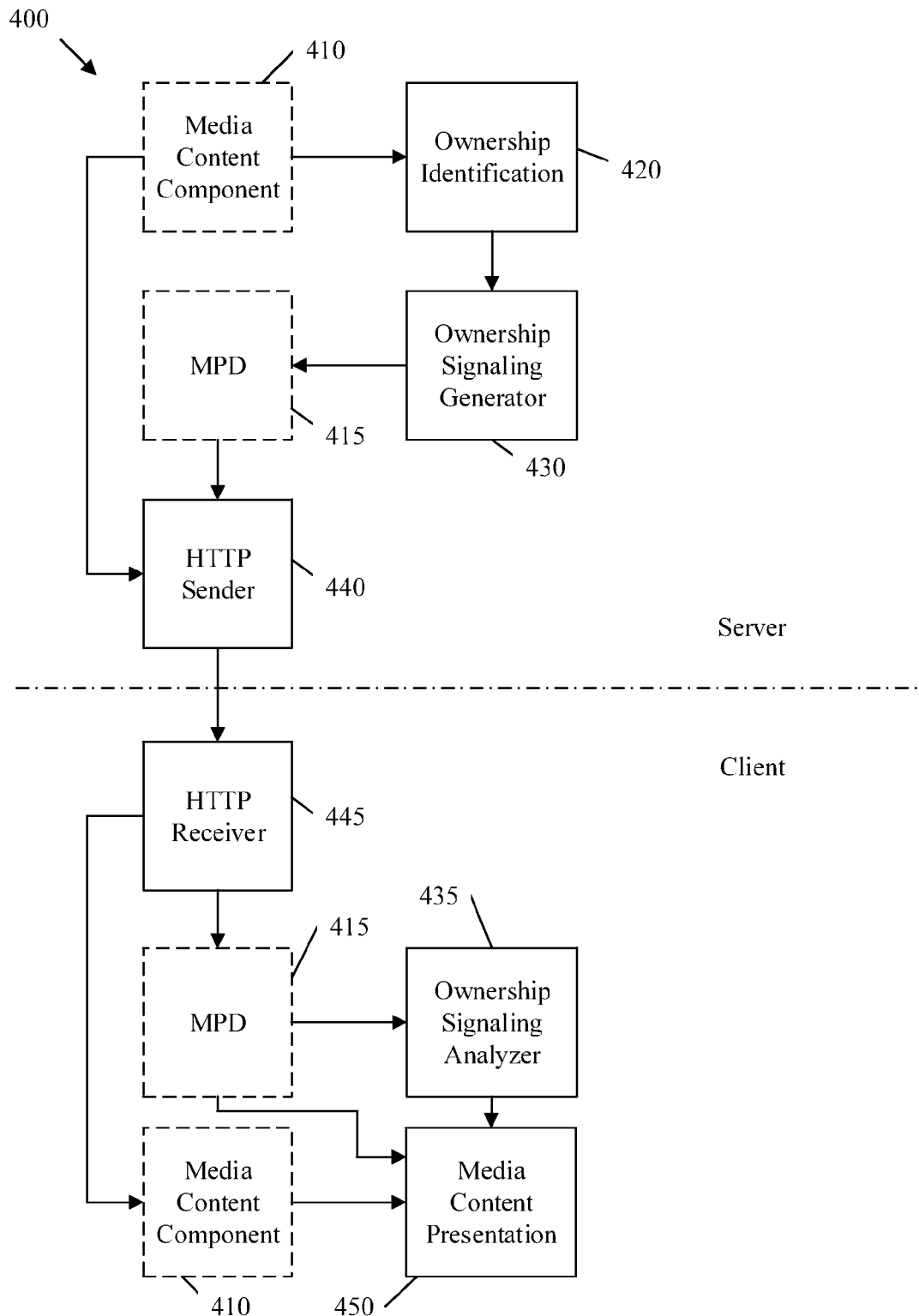
FIG. 4 is a schematic diagram of an embodiment of a DASH architecture for ownership identification.

FIG. 4 is a schematic diagram of an embodiment of a DASH architecture 400 for ownership identification. The DASH architecture 400 may be implemented by a DASH server and a DASH client, such as DASH server 121 and DASH client 130, respectively. Data structures are shown in dashed lines and operations are shown in solid lines. Server side data structures and operations are depicted at the top of FIG. 4, while client side data structures and operations are depicted at the bottom of FIG. 4, as separated by a dotted and dashed line. The server may receive a media content component 410, for example from a content publisher such as content publisher 110. The media content component 410 is forwarded to an ownership identification 420 operation. The ownership identification 420 operation may identify the ownership of the media content component 410 based on data from the publisher, extraction/analysis of a unique digital copyright identifier from the media content component 410, and/or extraction/analysis of a watermark from the media content component 410. The ownership information may be forwarded to the ownership signaling generator 430 operation. The ownership signaling generator 430 operation determines any additional ownership data such as content component identifier(s), flag(s) indicating whether the media content is authorized, and/or operations list(s). For example, the operations list(s) may be predefined for all content related to a particular owner, may be obtained by querying a database associated with the owner, e.g. a license server, etc. The ownership signaling generator 430 operation encodes the ownership information into an MPD 415 along with any other information needed to locate and play the media content. The MPD 415 is forwarded to the client upon request via the HTTP sender 440 operation.

The client receives the MPD 415 via an HTTP receiver 445 operation, and forwards the MPD 415 to an ownership signaling analyzer 435 operation. The ownership signaling analyzer 435 operation extracts the ownership information from the MPD 415, verifies the ownership information as needed, determines any required operations based on the operations list(s), and forwards the required operations to a media content presentation 450 operation. The media content component 415 is obtained from the server via the HTTP sender 440 and the HTTP receiver 445 based on the URLs in the MPD 415 (e.g. using GET requests to obtain the desired segments based on network conditions). The media content component 410 is forwarded to the media content presentation 450 operation along with the MPD 415. The media content presentation 450 operation then performs the required operations from the ownership signaling analyzer 435 while displaying the media content component 410 to a user based on the presentation information from the MPD 415. Based on the foregoing, the MPD 415 can be used to signal ownership information between the client and server as well as manage the use of the media content component in accordance to the content publishers requirements throughout the lifecycle of the media content.

Figure 5:
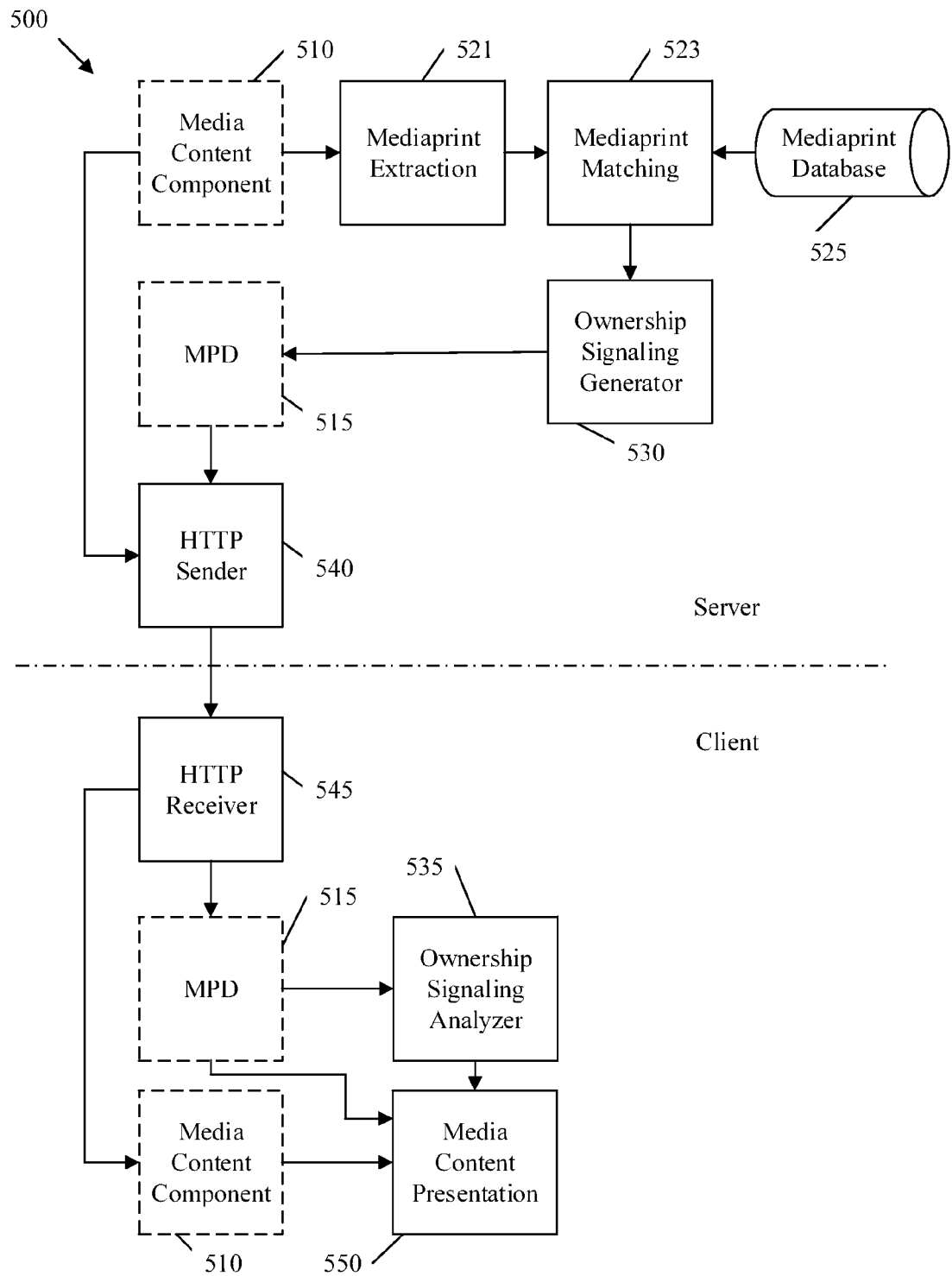
FIG. 5 is a schematic diagram of an embodiment of a DASH architecture for mediaprint based ownership identification.

FIG. 5 is a schematic diagram of an embodiment of a DASH architecture 500 for mediaprint based ownership identification. DASH architecture 500 may be substantially similar to DASH architecture 400. DASH architecture 500 comprises a media content component 510, a MPD 515, an ownership signaling generator 530 operation, an HTTP sender 540 operation, an HTTP receiver 545 operation, an ownership signaling analyzer 535 operation, and a media content presentation 550 operation, which may be substantially similar to media content component 410, MPD 415, ownership signaling generator 430 operation, HTTP sender 440 operation, HTTP receiver 445 operation, ownership signaling analyzer 435 operation, and a media content presentation 450, respectively. DASH architecture 500 further comprises a mediaprint extraction 521 operation, a mediaprint matching 523 operation, and a mediaprint database 525, which may implement an embodiment of an ownership identification operation substantially similar ownership identification 420 operation.

The mediaprint database 525 may be any server or other storage system configured to store, retrieve, and/or compare mediaprints, such as mediaprint server 123. The mediaprint database 525 may or may not be located in a common content network with the other components of DASH architecture 500. For example, a mediaprint server 123 may comprise a plurality of databases and may be substantially global in nature to allow the mediaprint server 123 to receive and store a library of mediaprints from a large number of media content components (e.g. mediaprints from every major movie release, etc.) The mediaprint sever 123 may employ the mediaprint library for ownership identification as discussed below.

The mediaprint extraction 521 operation is configured to receive the media content component 510 (e.g. from a content publisher 110 or other source) and extract/generate a mediaprint by obtaining/isolating characteristics of the media content component 510 by employing a predetermined algorithm. The mediaprint is forwarded to the mediaprint matching 523 operation. The mediaprint matching 523 operation communicates with the mediaprint database 525 to compare the mediaprint against the mediaprint library of the mediaprint database 525. Upon determining a match with a known mediaprint in the mediprint library, or receiving indication of a match from the mediaprint database 525, the mediaprint matching 523 operation can determine that the media content component 510 is owned by the same entity as the matched mediaprint from the mediaprint database. The ownership information may then be forwarded to the ownership signaling generator 530 operation for further processing in a manner substantially similar to DASH architecture 400.

Figure 6:
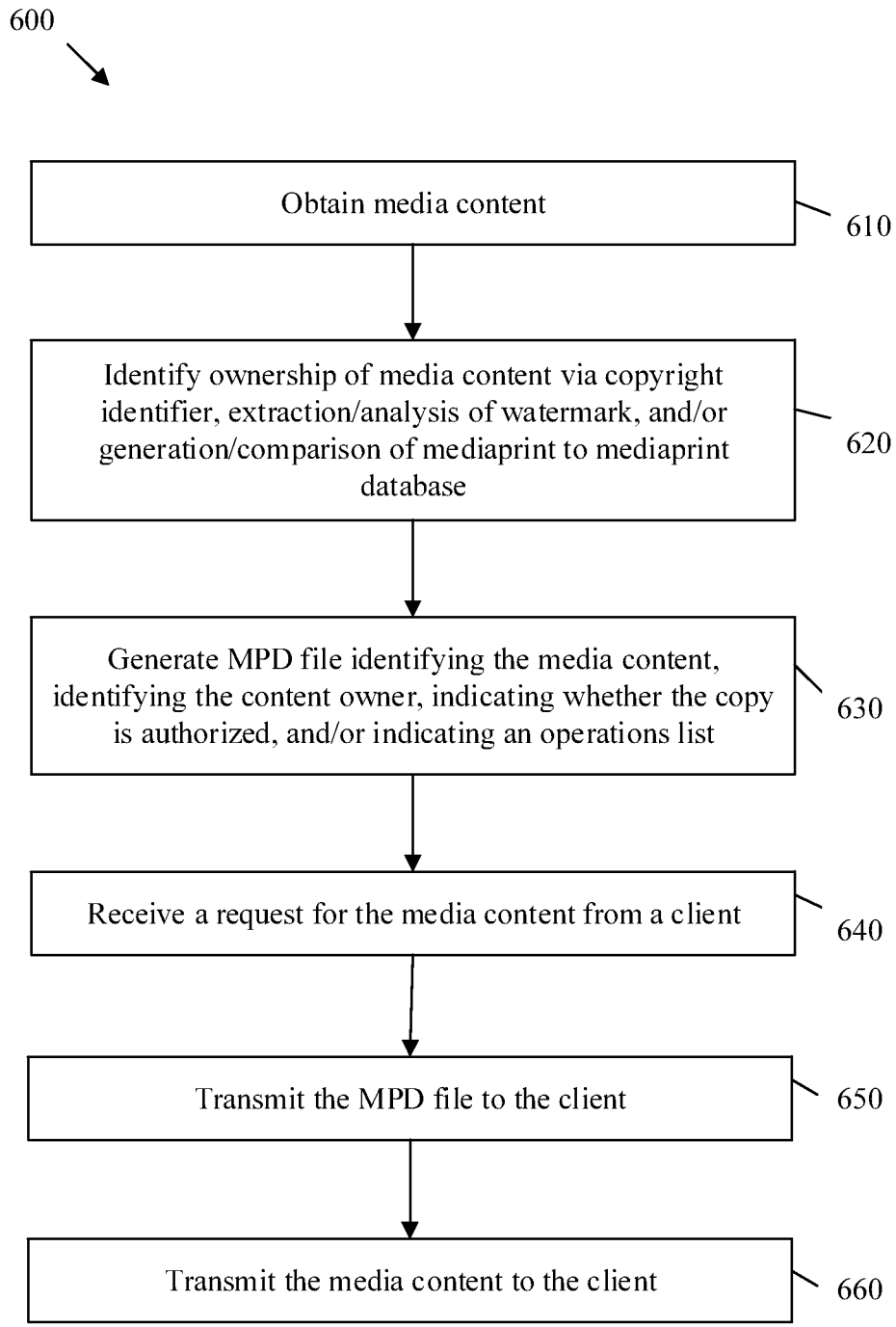
FIG. 6 is a flowchart of an embodiment of a method of DASH based ownership signaling.

FIG. 6 is a flowchart of an embodiment of a method 600 of DASH based ownership signaling. Method 600 may be implemented by a DASH content server, such as DASH content server 121, and may be initiated upon receipt of media content. At step 610, the media content is obtained, for example from a content publisher such as content publisher 110 or other source. At step 620, ownership of the media content is identified by any mechanism as discussed herein. For example, media content may be identified by obtaining a copyright identifier from the media content data file, extracting and analyzing a watermark associated with known owners, generating/comparing a mediaprint to a mediaprint database, or combinations thereof. At step 630, an MPD is generated to identify the media content, identify the content owner, indicate whether the associated copy of the media content is authorized, and/or indicate operations list(s) associated with the media content. The MPD also comprises any other information needed for a client to obtain and play the media content file segments. At step 640, a request for the media content is received from a client, such as DASH client 130. At step 650, an MPD file is transmitted to the client. At step 660, the media content is transmitted to the client, for example in response to an HTTP get request. It should be noted that step 660 may be omitted in some embodiments as the media content may be stored in a separate server that the DASH content server generating the MPD. As such, in some embodiments, the MPD directs the client to obtain the media content from other server(s), which would perform step 660.

Figure 7:
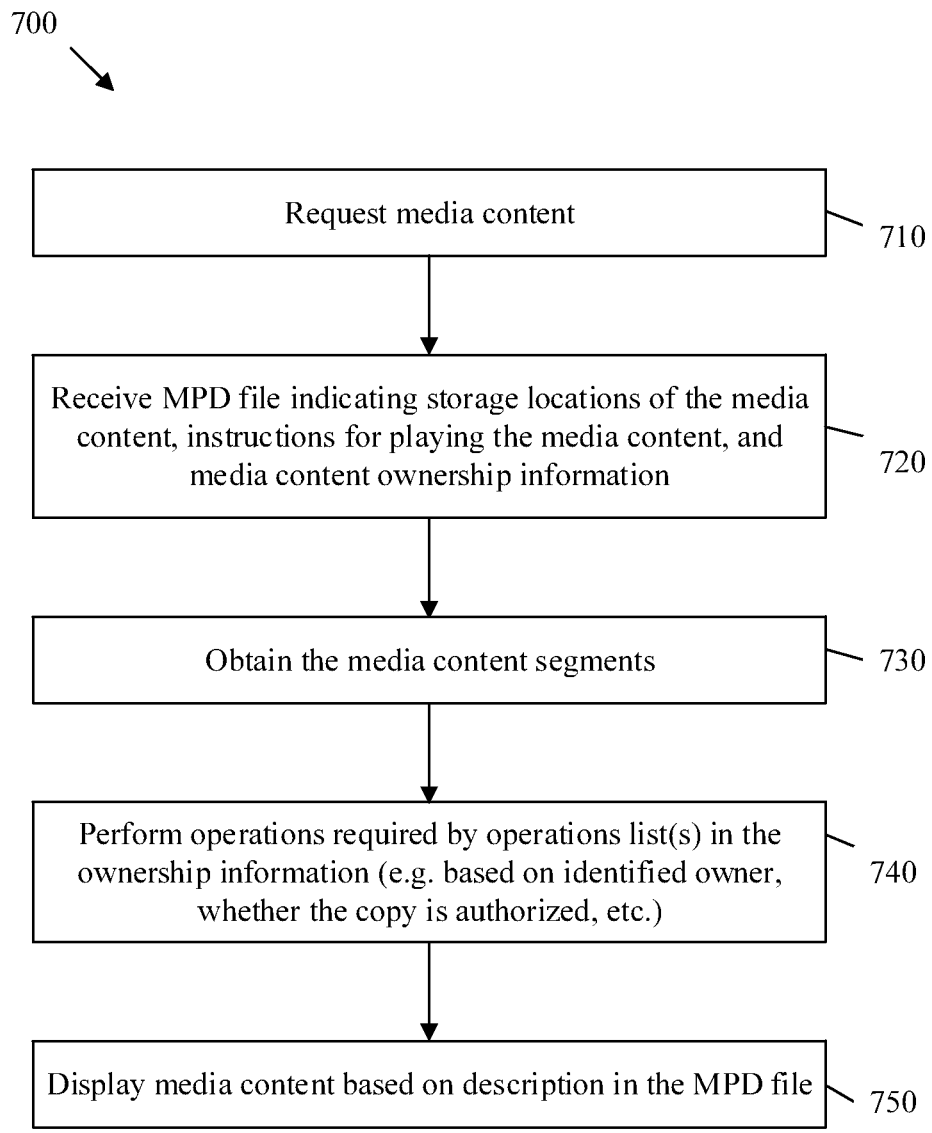
FIG. 7 is a flowchart of an embodiment of a method of DASH based ownership contingent media content management.

FIG. 7 is a flowchart of an embodiment of a method 700 of DASH based ownership contingent media content management, which may be implemented by a DASH client such as DASH client 130. Method 700 may be implemented when a DASH client receives input from a user requesting a particular media content file. At step 710, a media content request may be transmitted to a DASH content server, such as DASH content server 121. At step 720, an MPD file for the requested media content may be received from the DASH content server. The MPD file may comprise storage locations of the media content segments, such as URLs, based on representation (e.g. resolution, frame rate, etc.), adaptation set, period, etc. The MPD may also comprise instructions for synchronizing the segments for presentation to the user and the media content ownership information as discussed above. At step 730, the media content segments are obtained based on the information in the MPD.

At step 740, any operations required by the operations lists in the ownership information are performed, for example based on identification of the owner, determination of whether the content is authorized, etc. It should be noted that in some embodiments, the operations of the operations lists may be performed prior to obtaining the media segments. When different or conflicting operation lists exist for two or more content components of the media content, the client can coordinate the performing of the operation lists according to a priority of video component first, then audio component, and then subtitle component. In some embodiments when different/conflicting operations exist, the client may select a particular operations list to perform and ignore the other operation lists. When performing multiple operations lists, the client may perform all operations sequentially (e.g. one operation at a time), perform all operations concurrently, and/or perform all operations globally sequentially and locally concurrently (e.g. begin processing all operations lists concurrently and perform each operation of a particular list sequentially). Upon completing the operations, at step 750, the media content may be displayed to the user based on the descriptions in the MPD as constrained by the required operations in the operations list(s).

DASH may be enhanced to manage ownership information by modifying the definition of the element Content-Component by adding an element of Ownership. The Ownership element is optional (O) and may occur only once in each ContentComponent. Example semantics and syntax are described as follows:

1) Semantics of ContentComponent Element

TABLE 1

Semantics of ContentComponent Element

| Element or Attribute Name | Use | Description |
|---|---|---|
| ContentComponent | | Description of a content component |
| ... | ... | ... |
| Ownership | O | Specifies child element ownership |

2) XML Syntax of ContentComponent Element

```
<xs:complexType name="contentComponentType">
    <xs:sequence>
        ...
        <xs:element
name="Ownership" type="OwnershipType" minOccurs="0"
maxOccurs="1" >
        </xs:sequence>
        ...
</xs:complex
```

3) Semantics of Ownership Element

TABLE 2

Semantics of Ownership Element

| Element or Attribute Name | Use | Description |
|---|---|---|
| Ownership | | Description of the ownership of a content component |
| @contentComponentId | O | Specifies a unique identifier for the content component |
| @contentOwnerId | M | Specifies a unique identifier for the content owner |
| @unauthorizedCopy | M | Specifies whether the content component is an unauthorized copy or not |
| @operationList | M | Specifies the operations the owner expect the client to perform |

4) XML Syntax of Ownership Element

```
<xs:complexType name=" ownershipType">
    <xs:sequence>
        <xs:attribute name="contentComponentId"
        type="xs:unsignedInt" use="optional" / >
        <xs:attribute name="contentOwnerId" type="xs:string"
        use="required" / >
    <xs:attribute name="unauthorizedCopy" type="xs:boolean"
default= "false" use="required" / >
    <xs:attribute name=" operationList" type="xs:string"
    use="required" / >
    </xs:sequence>
</xs:complex
```

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A content server comprising:
   a processor configured to:
      obtain a media content component;
      identify an ownership of the media content component; and
      generate a Dynamic Adaptive Streaming over Hypertext Transfer Protocol (HTTP) (DASH) Media Presentation Description (MPD) indicating storage locations of segments of the media content component, indicating instructions for displaying the segments of the media content component, and indicating ownership of the media content component;

a receiver coupled to the processor and configured to receive a request from a client for the media content component; and a transmitter coupled to the processor and configured to transmit the HTTP DASH MPD indicating the ownership of the media content component to the client in response to receiving the request.

2. The content server of claim 1, wherein the media content component is divided into a plurality of periods, and wherein the ownership is indicated for at least some of the periods by a digital copyright identifier associated with an owner of the media content component.

3. The content server of claim 1, wherein the media content component comprises a plurality of representations, wherein each representation comprises a copy of the segments encoded at an associated display resolution, wherein a watermark associated with an owner of the media content component is embedded into at least one of the segments in each representation, and wherein identifying the ownership of the media content component comprises:
   extracting the watermark from the segments; and
   identifying the ownership by analyzing the watermark.

4. The content server of claim 1, wherein the media content component comprises a plurality of representations, wherein each representation comprises a copy of the segments encoded at an associated display resolution, and wherein identifying the ownership of the media content component comprises:
   generating a content mediaprint from at least one of the segments of at least one of the representations; and
   comparing the content mediaprint against a plurality of stored mediaprints to determine the ownership of the media content component.

5. The content server of claim 1, wherein the HTTP DASH MPD comprises a flag set to indicate whether the media content component is an authorized copy.

6. The content server of claim 1, wherein the HTTP DASH MPD comprises an operations list indicating operations the client is required to perform when displaying the media content component.

7. The content server of claim 6, wherein the required operations are different for different periods of the media content component.

8. The content server of claim 6, wherein the required operations are different for different representations of the media content component.

9. The content server of claim 6, wherein the operations list comprises:
   a first set of required operations when the media content component is an authorized copy; and
   a second set of required operations when the media content component is not an authorized copy,
   wherein the first set of operations is different from the second set of operations.

10. A method implemented in a Dynamic Adaptive Streaming over Hypertext Transfer Protocol (HTTP) (DASH) client, the method comprising:
   requesting, via a transmitter, media content from a DASH server;
   receiving, via a receiver, a DASH Media Presentation Description (MPD) indicating storage locations of segments of the media content, indicating instructions for displaying the segments of the media content, and indicating ownership information associated with the media content;
   obtaining, via the transmitter and the receiver, at least some of the segments from the storage locations indicated by the DASH MPD; and
   displaying, via a display, the obtained segments according to the instructions for displaying the segments and the ownership information.

11. The method of claim 10, wherein the ownership information in the DASH MPD comprises an operations list indicating operations the client is required to perform when displaying the media content.

12. The method of claim 11, wherein the required operations include filtering out portions of the media content, requiring a user of the HTTP DASH client pay prior to displaying the media content, displaying required advertisements when displaying the media content, reporting DASH client media content usage statistics, requiring display of a specified media content representation based on user payment status, or combinations thereof.

13. The method of claim 10, wherein the ownership information in the DASH MPD comprises:
   a first operations list indicating operations the client is required to perform when playing an audio portion of the media content;
   a second operations list indicating operations the client is required to perform when displaying a video portion of the media content; and
   a third operations list indicating operations the client is required to perform when displaying a sub-titled portion of the media content.

14. The method of claim 10, wherein the ownership information in the DASH MPD comprises:
   a flag indicating whether the media content is an authorized copy;
   a first operations list indicating operations the client is required to perform when the media content is an authorized copy; and
   a second operations list indicating operations the client is required to perform when the media content is not an authorized copy.

15. The method of claim 10, wherein the ownership information in the DASH MPD comprises a unique identifier indicating an owner of the media content.

16. A method implemented in a Dynamic Adaptive Streaming over Hypertext Transfer Protocol (HTTP) (DASH) content server, the method comprising:
   receiving, by a receiver of the DASH content server, a media content component;
   identifying, by a processor of the DASH content server, an ownership of the media content component;
   generating, by the processor, a DASH Media Presentation Description (MPD) indicating storage locations of segments of the media content component, indicating instructions for displaying the segments of the media content component, and indicating ownership of the media content component;
   receiving, by the receiver, a request from a client for the media content component; and
   transmitting, by a transmitter of the DASH content server, the DASH MPD indicating the ownership of the media content component to the client in response to receiving the request.

17. The method of claim 16, wherein the media content component comprises a plurality of representations, wherein each representation comprises a copy of the segments encoded at an associated display resolution, wherein a watermark associated with an owner of the media content component is embedded into at least one of the segments in each representation, and wherein identifying the ownership of the media content component comprises:
   extracting the watermark from the segments; and
   identifying the ownership by analyzing the watermark.

18. The method of claim 16, wherein the media content component comprises a plurality of representations, wherein each representation comprises a copy of the segments encoded at an associated display resolution, and wherein identifying the ownership of the media content component comprises:
   generating a content mediaprint from at least one of the segments of at least one of the representations; and
   comparing the content mediaprint against a plurality of stored mediaprints to determine the ownership of the media content component.

19. The method of claim 16, wherein the DASH MPD comprises a flag set to indicate whether the media content component is an authorized copy.

20. The method of claim 16, wherein the DASH MPD comprises an operations list indicating operations the client is required to perform when displaying the media content component.

* * * * *